Patented July 22, 1941

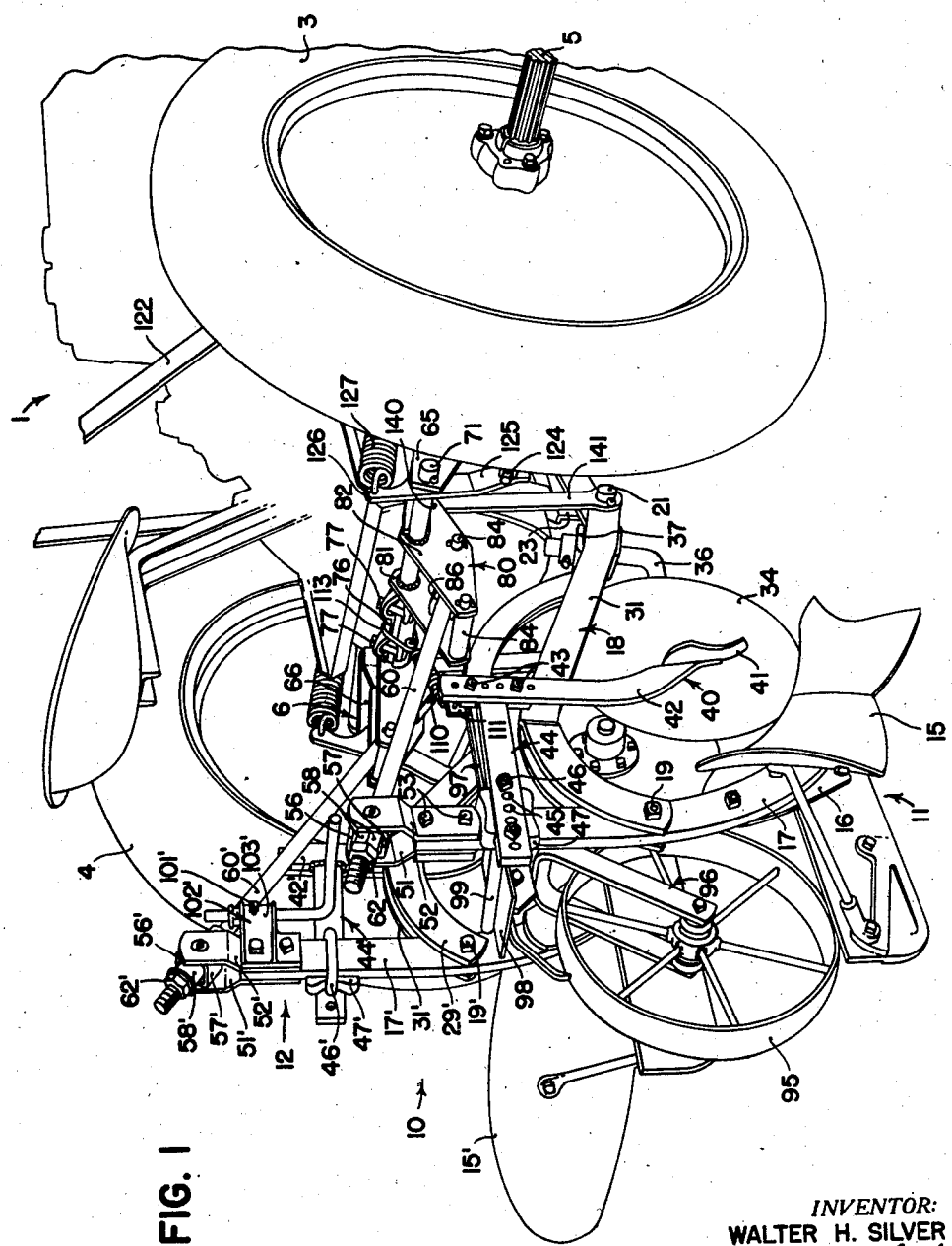
FIG. 1
INVENTOR:
WALTER H. SILVER
ATTORNEYS.

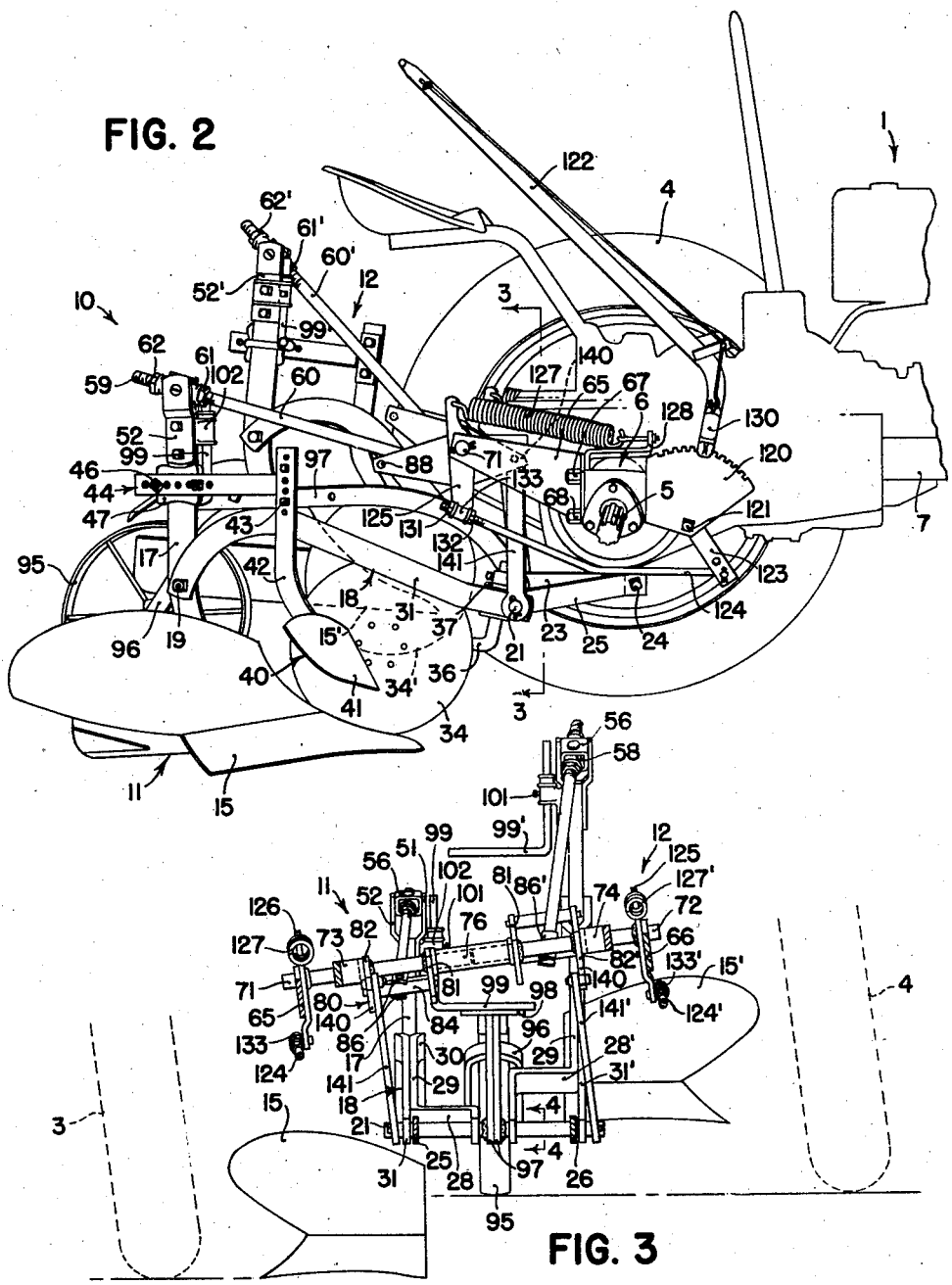

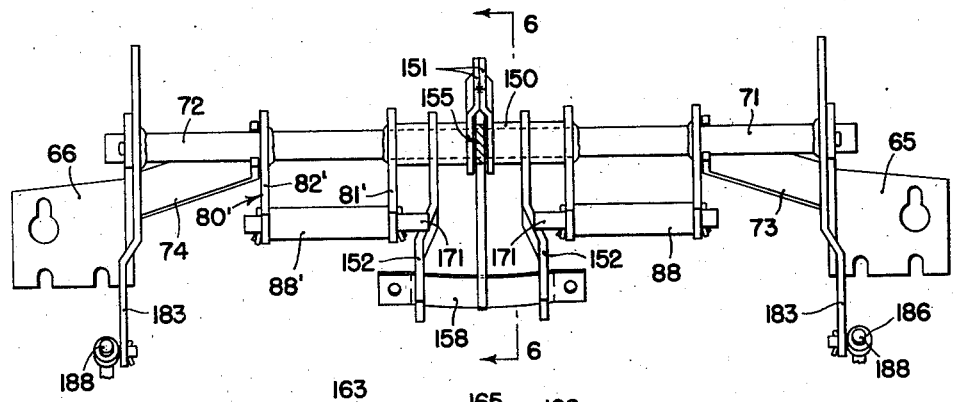
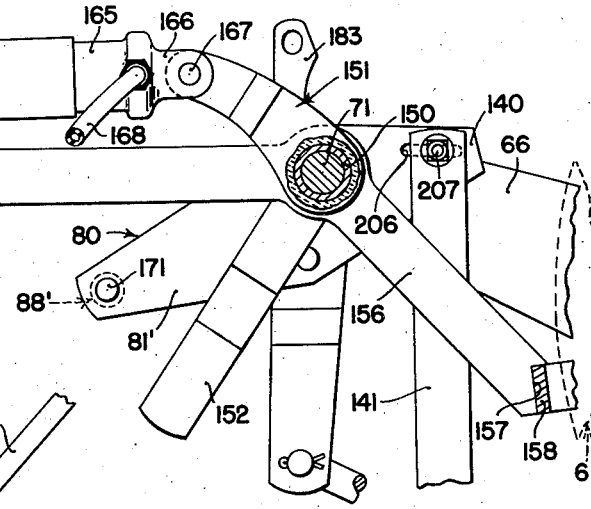
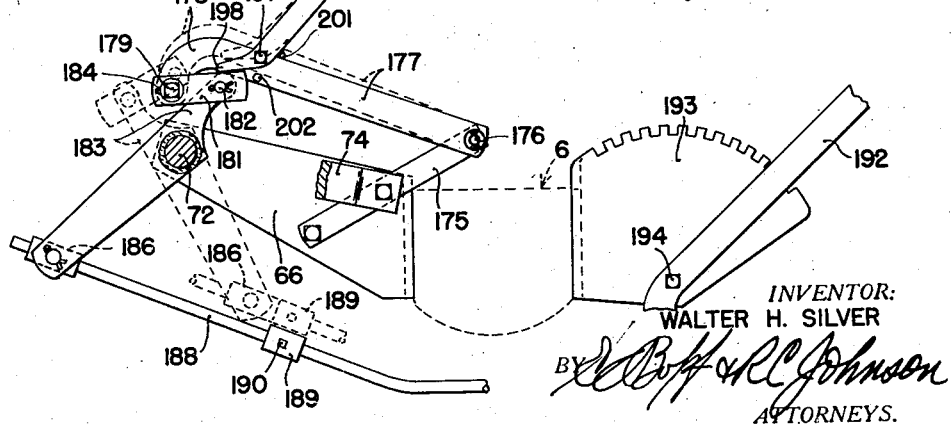

2,249,861

UNITED STATES PATENT OFFICE 2,249,861

TWO WAY PLOW

Walter H. Silver, Moline, Ill., assignor to Deere & Company, Moline, Ill., a corporation of Illinois Application August 4, 1940, Serial No. 351,369

29 Claims. (Cl. 97—29)

This invention relates generally to plowing implements and more particularly to two-way plows carrying a pair of right and left hand plowing units which are adapted for alternate operation so as always to throw the furrow slice in one direction regardless as to whether the implement moves one way or the other across the field.

The object and general nature of the present invention is the provision of a two-way plow in which the furrow openers are supported by parallel link mechanism with which is associated means for shifting at least one of the links of each plowing unit generally longitudinally to adjust the operating depth, by varying the suction, and acting through said links for raising and lowering the furrow openers into and out of their transport position. In this connection it is a further feature of this invention to provide an improved two-way plow of the integral type in which each plowing unit is connected with the tractor by parallel link mechanism, with depth adjusting and raising and lowering operations effected through one link of each pair of links. Still further, another feature of this invention is the provision of automatically leveling the down bottom when the latter is in its operating position and the other is in its transport position, thus eliminating separate leveling levers and the like. Still another feature of this invention is the provision of a two-way plow, each plowing unit of which is provided with a rolling coulter, in which the supporting linkages are such that when one plowing unit is raised, the associated rolling coulter occupies a position below the point or points of the furrow openers, thus preventing trash and the like from catching on the raised furrow opener when operating in trashy conditions.

A further feature of this invention is the provision of a two-way tractor-mounted plow in which a gauge wheel is disposed between the two plowing units and is effective to gauge or control the operating depth of either of the plowing units. It is also a feature of this invention to provide spring means for raising the gauge wheel when both of the plowing units are raised into their transport position. The gauge wheel need not be raised as high as the furrow openers. Further, another feature of this invention is the provision of hydraulic means, such as a cylinder and piston unit, arranged to raise either or both of the plowing units into their transport position, in connection with the manually controlled latch mechanism permitting either plowing unit to be dropped into plowing position, as desired. Still another feature of this invention is the provision of hydraulic means for both raising and lowering the plowing units and also controlling the operating depth when in plowing position.

Another feature of this invention is the provision of a two-bottom two-way plow having generally parallel links connecting each furrow opener of each plow with wheeled supporting means, with raising and lowering and depth adjusting means acting through said links for controlling the plow bodies of the plowing units. Another feature of this invention is to provide hydraulically operated means on the tractor effective to actuate at least certain of said links for controlling the furrow openers. More particularly, it is a feature of this invention to provide a hydraulic unit arranged and connected so as to have, in effect, two ranges of movement, one for adjusting the plowing depth and the other for raising and lowering the furrow openers into and out of their transport position. An additional feature of this invention is the provision of improved mounting connections for the hydraulic unit so that the same may be conveniently and quickly attached or removed, as desired. Preferably, the hydraulic unit, particularly the piston and cylinder means, is constructed so as to be a part of the implement and therefore is attachable to and removable from the tractor with the implement itself.

Another feature of this invention is the provision of hydraulic means that comprises a single piston and cylinder unit arranged to operate a pair of arms arranged to engage the lifting arms with which the upper links of the two-way plow connections are associated, whereby when the hydraulic unit is operated the down plow is raised, irrespective of whether the down plow is the right hand unit or the left hand unit, and if both plowing units should be resting on the ground, then both units will be raised. In this connection, it is a further feature of this invention to provide improved mechanism for locking either or both of the plowing units in their raised position. The preferred form of said means includes a lock of the toggle type which is operatively connected with the shaft means controlling the aforesaid arms. A still further feature of this invention is the provision of manually operated means having a one-way connection with the toggle controlled arms, whereby individual depth adjustment may be effected without interfering with the operation of the hydraulic unit in raising either or both of the units into their raised or transport position.

These and other objects and advantages of this invention will be apparent to those skilled in the art after a consideration of the following detailed description of the preferred structure, taken in conjunction with the accompanying drawings.

In the drawings:

Figure 1 is a perspective view showing an integral tractor-mounted two-way plow in which the principles of the present invention have been incorporated, the near plow bottom being in operating or plowing position;

Figure 2 is a side view of the two-way plow shown in Figure 1;

Figure 3 is a section taken generally along the line 3—3 of Figure 2, showing the connecting linkage for automatically leveling the down bottom;

Figure 4 is a fragmentary section taken generally along the line 4—4 of Figure 3;

Figure 5 is a fragmentary view showing a modified form of lifting linkage by which a hydraulic cylinder and piston unit is utilized for raising the plows;

Figure 6 is a view taken substantially along the line 6—6 of Figure 5; and

Figure 7 is a side view of the mechanism for latching each plowing unit in its transport position.

Referring now to the drawings, more particularly to Figures 1 to 4, which disclose a hand lift tractor-mounted integral two-way plow, the tractor is indicated in its entirety by the reference numeral 1 and includes front wheels (not shown), right and left hand rear traction wheels 3 and 4 fixed to axle shafts 5 supported in a rear axle housing 6. The latter is secured to or forms a part of the frame of the tractor, indicated generally by the reference numeral 7. Each of the rear axle housing extensions is provided with attaching studs or the like adapted to receive various implement parts.

The two-way plow shown in Figures 1 to 4, inclusive, is indicated in its entirety by the reference numeral 10 and includes a right hand unit 11 and a left hand unit 12. Generally speaking, the right and left hand units have identical parts except that some of them are right hand while others are left hand.

Referring first to the right hand unit 11, the furrow opener is shown as a moldboard plow bottom 15 the frog 16 of which is secured in any suitable manner to the lower end of a standard 17. A plow beam 18 is pivoted, as at 19, to the standard 17 and at its forward end is apertured and is mounted on a cross shaft 21 which extends transversely of the tractor. A pair of hitch angles 23 are bolted to the under side of the tractor rear axle and at their forward ends carry pivot studs 24. Right and left hand hitch links 25 and 26 are pivoted at their forward ends on the studs 24 and at their rear ends are apertured and receive the cross shaft 21. The right hand plow beam 18 is pivoted to the right end portion of the cross shaft 21 and carries a laterally inwardly directed bracket 28 which at one end is rigidly secured to the beam 18 and at the other end is slotted, as at 27' (Figure 4), to receive the cross shaft 21 generally at the central portion thereof, as best shown in Figure 3. The purpose of the bracket 28 is to prevent the plow beam 18 from tilting laterally but to permit a limited amount of lateral swinging relative to the cross shaft 21. Preferably, the bracket 28 forms a part of an inner beam strap 29 the rear end of which is offset laterally inwardly, as at 30, so as to be disposed on the laterally inner side of the standard 17, the laterally outer beam strap being indicated at 31 (Figure 1) and being of similar formation. A rolling coulter 34 is disposed adjacent the landside of the plow bottom 15, being disposed some distance forward of the point of the plow bottom, and is journaled for rotation on the rear end of a coulter shank 36, the upper end of which is fixed by a clamp 37 to the laterally inwardly extending section of the bracket 28 closely adjacent the axis of the cross shaft 21. A jointer 40 consisting of a point 41 bolted or otherwise fixed to a shank 42 is bolted, as at 43, to a jointer standard 44. The latter consists of a generally T-shaped bar provided with a number of openings spaced vertically, the upper end of the jointer shank 42 also having a plurality of openings so as to afford a range of adjustment for the vertical position of the jointer 40. The rear end of the standard 44 is also provided with a number of openings 45 in which the ends of a U-bolt 46 are received. The U-bolt 46 embraces the upper end of the plow standard 17 and serves to fix the jointer standard 44 in position, there being a saddle casting 47 formed to receive the upper portion of the standard 17 and the rear portion of the standard 44 and to hold them in the proper relative position.

A pair of yoke straps 51 and 52 are bolted, as at 53, to the upper end of the standard 17 and are apertured to receive upper and lower pivot straps 56 and 57 and to accommodate swinging movement of the latter about a transverse axis. The pivot straps 56 and 57 are apertured and receive upper and lower pivot studs formed on or carried by a threaded sleeve 58 in which the rear threaded end 59 of a depth adjusting rod 60 is received. The sleeve 58 can swing laterally between the pivot straps 56 and 57, and the latter may, in turn, rock about a transverse axis, thus affording a flexible connection between the rear end of the depth adjusting rod 60 and the upper end of the plow standard 17.

As mentioned above, the left hand plowing unit 12 is of substantially the same construction as the right hand plowing unit 11, described above, except that certain parts may be right and left hand, respectively. Therefore, the above description of the right hand plowing unit 11 will suffice for the left hand plowing unit 12. The same reference numerals, except that a prime as been added, will be used for the corresponding parts of the left hand plowing unit.

As best shown in Figure 3, right and left hand brackets 65 and 66 are secured, as at 67 and 68 (Figure 2), to the tractor rear axle housing, the major portion of each of the brackets 65 and 66 extending generally rearwardly and serving as a bearing support for a pair of axially aligned depth adjusting shaft sections 71 and 72. Braces 73 and 74 lend rigidly to the depth adjusting shaft supporting means. A shaft clamp in the form of a split sleeve 76 carrying a pair of bolts 77 surround the adjacent inner ends of the lifting and depth adjusting shaft sections 71 and 72. Preferably, the sleeve 76 is bolted tight to the left hand shaft section 72, the right hand bolt 77 being drawn up sufficiently to obtain a snug fit but with the right hand shaft section 71 free to turn in the sleeve 76.

Referring again to the right hand plowing unit 11, the right hand lifting and depth adjusting shaft 71 carries an arm 80 (Figure 1) which consists of two plates 81 and 82 welded or otherwise permanently fixed to the associated shaft section 71 in any suitable manner and in spaced apart relation. A pivot member 84 is pivoted to the two plates 81 and 82 adjacent the axis of the shaft 71 but rearwardly and below the latter, as best shown in Figure 1, and a pair of yokes 86 are fixed to the forward end of the right hand depth adjusting link 60, preferably on the upper and lower sides thereof. The yokes 86 are apertured at their forward end to receive pivot studs on the pivot member 84 whereby the link 60 is permitted to have a certain amount of limited lateral swinging movement. The rearmost ends of the arm plates 81 and 82 are apertured to receive a bushing or roller 88 which normally lies below the link and rearwardly of the pivot connection 84, 86 with the arm 80. The left hand plowing unit 12 is provided with similar means connecting the forward end of the link 60' with the left hand lifting and depth adjusting shaft section 72. As will be seen from Figure 1, when the right hand shaft section 71 is rocked through a relatively small amount, the link 60 will be given generally longitudinal movement, and this in turn will serve to tilt the plow standard 17 about its pivotal connection, at 19, with the generally forwardly extending plow beam 18. As mentioned above, normally there is a certain amount of space between the bushing 88 and the link 60 to accommodate a limited amount of upward movement of the rear end of the lifting arm 80 before the bushing 88 engages the link 60. However, after engagement takes place, continued upward movement of the rear end of the arm 80 will act through the line 60 to raise the plow standard 17 and the plow bottom 15. In effect, therefore, the plow beam 18 and the link 60 constitute a pair of generally parallel links connecting the furrow opener with the tractor whereby not only is the furrow opener free to float generally vertically but, in addition, generally longitudinal movement of one of the links is accomplished by rocking the shaft 71 through a small amount or range, whereby the depth of plowing will be adjusted. Moreover, when the shaft 71 is rocked beyond said range, the upper link 60 is raised bodily about the axis of the shaft 71, and this, in turn, raises the plow bottom 15 into its transport position. The same is true, of course, of the left hand plowing unit 12, Figures 1 and 2 showing the left hand plowing unit in raised or transport position and the right hand unit in operative or plowing position. By virtue of the parallel link connection just mentioned, the furrow opener is raised generally bodily, and due to the fact that the standard 17 or 17', is connected with the gear ends of the links 18, 60 or 18', 60', when raising either plowing unit, the point of the furrow opener rises a substantial distance above the associated coulter, which it will be remembered has its standard or shank fixed directly to the forward end of the plow beam and closely adjacent to the axis of pivotal movement thereof. Therefore, in effect, when either furrow opener is raised, the coulter associated therewith drops down below the point of the furrow opener and will prevent trash from catching on the point of the raised bottom when operating in trashy conditions.

By virtue of the parallel link connection between each plow bottom and the tractor, under most conditions, each bottom is caused to operate at the proper level after seeking the desired depth. However, there may arise conditions in which the depth of plowing may tend to vary, in which case it would be desirable to have a gauge wheel or the like so that the plow bottom may be adjusted for fairly deep plowing, relying on the gauge wheel to limit the depth of plowing. The depth of plowing may be adjusted by rocking the shaft section 71 or 72 or by adjusting the effective length of the link 60 or 60' by means of the lock nuts 61 and 62. Therefore, according to the principles of the present invention, I provide a gauge wheel 95 journaled for rotation in a yoke 96, the upper end of which is fixed in any suitable manner to a pair of draft links 97, the forward ends of which are welded or otherwise permanently fixed to the cross shaft 21, preferably in the central portion thereof between the brackets 28 and 28'. The rear portion of the links 97 carry an abutment plate 98. The right hand plowing unit 11 is provided with an L-shaped stop rod 99, the vertical portion of which is suitably fixed, as by a set screw 101, in a bracket 102 bolted to the side of the laterally inner pivot yoke 51. The left hand plowing unit 12 is provided with a stop rod 99' and associated parts of similar construction. As best shown in Figure 3, the stop rods 99 and 99' are arranged with their lower ends disposed alongside one another and over the abutment plate 98 on the gauge wheel drawbar 97. As will be noted from Figure 1, the sleeve portion 103' of the bracket 102' which receives the vertical part of the stop rod 99' is disposed at the upper end of the bracket. Also, it will be seen that various depths may be accommodated by adjusting the stop rod 99 and 99' in the bracket 102 or 102'. If more adjustment is required than is afforded by the set screw 101 and 101' and the length of the vertical part of the associated stop rod, then the brackets 102 and 102' may be reversed end for end and attached to opposite plow standards 17 and 17' so as to dispose the rod receiving sleeve sections at the lower part of the bracket, instead of at the upper part as shown in Figure 1.

When one plow bottom is lowered into operating position, the associated stop rod 99 or 99' engages the abutment plate 98, whereby the downward movement of the down bottom is limited. However, when both bottoms are raised into their transport position, it is desirable to support the gauge wheel 95 out of engagement with the ground. To this end, a spring 110 is connected at its rear end by a lug 111 to the gauge wheel drawbar 97 and at its forward end the spring 110 is connected to a loop 113 which encircles the sleeve 76. The tension exerted by the spring 110 is sufficient to overcome the weight of the gauge wheel 95 and gauge wheel drawbar, but is lighter than the weight of either of the plowing units. Therefore, when either plowing unit is in operating position the gauge wheel 95 runs along the ground, but when both plowing units are raised into their transport position, the spring 110 lifts the gauge wheel 95 out of contact with the ground.

According to the form of the invention shown in Figures 1 to 4, inclusive, suitable manually operated means is provided for raising either or both of the units into and out of their transport position. As best shown in Figure 2, a sector 120 is fixed to the forward side of the right hand rear axle extension 6 and carries a pivot 121 upon which a hand lever 122 is mounted for generally fore and aft swinging movement. The lower end 123 of the lever 122 is connected by a link 124 which extends underneath the rear axle to an arm 125 that is fixed to the right hand rock shaft 71, as by welding or the like. The arm 125 is extended upwardly, as at 126, and is apertured to receive the rear end of a spring 127, the forward end of which is adjustably secured to an anchor bracket 128 that is bolted to the forward side of the right hand shaft supporting bracket 65. The hand lever 122 carries detent mechanism 130 which cooperates with the sector 120 for latching the hand lever 122 in any adjusted position. Also, the effective length of the link 124 may be adjusted by means of a pair of lock nuts 131 and 132 which are disposed on opposite sides of a pivot sleeve 133 carried at the lower end of the arm 125. A similar lifting linkage is provided for the left hand unit, corresponding parts being indicated by the same reference numerals primed.

The position of the lever 122 in Figure 2 is that corresponding to a position of minimum plowing depth. In reaching this position the lever 122 has been moved from its rear position to the position shown which, acting through the link 124, rocked the arm 80 in a clockwise direction, exerting a generally rearwardly directed thrust through the link 60 against the upper end of the plow standard 17, thus raising the point. When the lever 122 is swung forwardly the additional thrust exerted through the link 124 will cause the bushing 88 to engage under the link 60 and raise the plow bottom 15 up to the position in which the left hand plow bottom 15' is shown. In this connection it is to be noted that with the present arrangement, in raising the furrow openers, the movement of the lever performing this operation proceeds through a depth adjusting range, progressively decreasing the depth of plowing, and passing into a lifting range in which the bottom is lifted out of engagement with the ground. It will be seen, therefore, that the initial raising of the point to adjust for shallow plowing materially facilitates getting the plow bottoms out of the ground.

As best shown in Figure 2, the plate 82 of the lifting arm 80 for the right hand plowing unit is extended forwardly of the shaft 71, the extended portion forming a leveling arm 140 to which the upper end of a leveling link 141 is pivoted. The lower end of the link 141 is pivoted on the right hand end of the cross shaft 21. The plate 82' of the left hand unit is likewise extended forwardly to form a leveling arm 140' (Figure 3) and is connected by a link 141' to the left end of the cross shaft 21. As best shown in Figure 3, when one plow bottom is lifted and the other lowered, the cross shaft 21 is tilted in the right direction and through the right extent for leveling the down bottom to compensate for one wheel of the tractor running in the furrow. Moreover, it will be seen that as one or the other of the levers 122 or 122' is adjusted for depth of penetration, the cross shaft or bar 21 is also adjusted to level the down bottom. It will also be seen that the links 141 and 141' determine the height of hitch for the cross shaft 21, and if desired, this may be varied by having a plurality of holes in the links 141 and 141' to receive the pivot pin connecting the upper end of each link with the associated depth adjusting and lifting arm.

In the form of the invention described above, two separate hand levers are provided for raising and lowering the associated right and left hand plowing units. If desired, hydraulic mechanism may be arranged for raising either or both of the plowing units into and out of their transport position. According to the present invention, in the form shown in Figures 5 to 7, I replace the sleeve 76 with a sleeve 150 to the central portion of which is welded or otherwise permanently fixed a pair of arms 151. Another pair of arms 152 is welded to the other ends of the sleeve 150, these arms 152 being longer than and disposed at an angle to the arms 151, as best shown in Figure 6. A bracket 155 is loosely mounted for relative rocking movement on the sleeve 150 and between the arms 151. One end of the arm 155, as indicated at 156, is formed with a notch 157 to engage a transverse brace 158 which at its ends is fixed to a part of the tractor, such as over the differential housing. The other end of the arm 155, as indicated at 159, extends rearwardly and is formed with an upturned section 161 to which the piston rod 162 of a cylinder and piston unit 163 is pivoted by a pin 164 or the like. The cylinder of the unit 163 is indicated by the reference numeral 165 and at the other end carries an apertured ear 166 which is pivoted, as at 167, to the arms 151. A conduit 168 is provided for leading high pressure fluid under control into the cylinder 165 for extending the cylinder and piston, as a result of which the arms 151, 152 are rocked in a clockwise direction as viewed in Figure 6. The outermost ends of the arms 152 are adapted to engage laterally inwardly elongated pins 171 upon which the bushings 88 and 88', which are engageable with the under side of the depth adjusting and lifting links 60 and 60', are disposed. Preferably, the laterally inner ends of the pins 171 extend laterally inwardly beyond the inner plates 81 and 81' to receive the arms 152. Thus, whenever, the hydraulic unit 163 is extended both lifting arms 80 and 80' are actuated to raise both of the plowing units into their raised or transport position. In raising the plowing units, the hydraulic unit 163 reacts through the piston rod 162 against the arm 159, and the latter in turn reacts against the cross bar 158 fastened to the rear of the tractor. It will be noted that the hydraulic unit 163 may also be utilized to secure depth adjustment, although preferably individually operated hand levers are provided for this purpose, as will be described below, by extending the hydraulic unit just sufficient to swing the arms 80 and 80' through the required extent to place the depth adjusting rods 60 and 60' in the proper position to secure the depth of plowing desired. This is not, of course, absolutely essential where the gauge wheel 95 and associated parts are provided, in which case all that is necessary is that the rods 60 and 60' be positioned to secure enough penetration that the tools always bear with some weight down against the gauge wheel and cause the same to run along the surface of the ground.

In the form of the invention shown in Figures 5 to 7, in which a single hydraulic unit is utilized for raising both plowing units, it is necessary to provide means for holding one of the units up in its transport position in order to permit the hydraulic unit to be retracted in order to accommodate lowering of the other plowing unit. According to the present invention, this is accomplished, briefly, by means of individual latches which are adapted to hold either or both of the plowing units in their transport position, independently of the position of the hydraulic unit, and then when it is desired to lower one or the other of the plowing units, all that it is necessary to do is to release one or the other of the latch means. This latch mechanism will now be described.

Referring to Figure 7, which shows latching and adjusting means for the left hand plowing unit, a bracket 175 is bolted to the forward side of the rear axle housing 6, in any suitable manner. The front end of the bracket 175 is apertured to receive a pivot pin 176 upon which the bifurcated end of a link 177 is mounted. The rear end 178 of the link 177 is turned downwardly to form a nose and is apertured to receive a pin 179 upon which one end of a link 181 is mounted. The other end of the link 181 is connected by a pivot pin 182 to the upper end of an arm 183 that is welded or otherwise permanently fixed to the lifting and depth adjusting shaft 72. The link 181 is slotted, as at 184, to receive the pin 179, this being necessary to permit the links 177, 181 to move into their locked position. The lower end of the arm 183 is apertured to receive the pivot of a sleeve 186 that is swiveled to the arm 183. A rod 188 is slidable at its rear end through the sleeve 186 and forward of the latter carries a stop collar 189, secured to the rod 188 by a set screw 190. The forward end of the rod 188 is pivoted to the lower end of a hand lever 192, which preferably is pivotally connected at 194 to a sector 193 fixed to the rear axle 6 of the tractor in substantially the same way the hand lever 122 is supported in the form of the invention shown in Figure 2. The lever 192 and sector 193 may, of course, be identical with the lever 122 and sector 120, described above.

The depth adjusting and latching mechanism for the left hand plowing unit is substantially the same as the construction just described, and hence further description is unnecessary, corresponding parts being indicated by the same reference numerals to which primes have been added.

As will be clear from Figure 7, which shows in full lines the arrangement of the depth adjusting and latching mechanism when the left hand plowing unit is raised; the arrangement of the parts when the left hand unit is lowered is shown in dotted lines. When in lowered position, the forward movement of the lower end of the arm 183 is limited by the engagement of the sleeve 186 with the collar 189, and the position of the latter is determined by the hand lever 192. When the hydraulic unit 163 is actuated to raise the left hand plowing unit, the engagement of the left hand arm 152 underneath the left hand pin 171 lifts the furrow opener through the link 60', at the same time rocking the shaft 72 in a clockwise direction. The hand lever 192 does not affect this movement, since the sleeve 186 merely slides rearwardly on the rod 188, away from the collar 189. Thus, the depth adjustment is not affected nor lost by raising the down bottom. The forward movement of the upper end of the arm 183 swings the link 181 from its dotted line position into its full line position. The pivots are so arranged that the link 181 passes into an over center position, with the result that the raised plowing unit is held in raised position by the engagement of the link 177 adjacent its end 178 with the upper end of the arm 183. In order to disengage the toggle links 177, 178, I provide a hand lever 196 which is pivoted, as at 197, to the link 177 and has an end 198 disposed in a position to engage the inner of the two straps constituting the link 181. Stops 201 and 202 limit the movement of the lever 196. Thus, when it is desired to drop the plowing unit, all that it is necessary to do is to pull the hand lever 196 rearwardly, which causes the end 198 to swing the link 181 past its over-center or locked position, and then the weight of the plowing unit causes the same to drop into plowing position. It is, of course, necessary that the hydraulic unit 163 be actuated to retract the arms 152 forwardly away from the pins 171, or at least to open the hydraulic circuit, so that the weight of the plowing unit when released will be sufficient to force the hydraulic fluid out of the cylinder 165.

In the form of the invention shown in Figures 5 to 7, the rear extension 140 of each of the arms 80 is slotted, as at 206, and a pivot 207, receiving the upper end of the associated link 141, is adjustably fixed in any suitable manner. This provides means whereby the amount of leveling of each bottom relative to depth adjustment thereof can be varied. This type of adjustment may also be used in the form of the invention shown in Figures 1 to 4.

While I have shown and described above the preferred structure in which the principles of the present invention have been incorporated, it is to be understood that my invention is not to be limited to the particular details shown and described, but that, in fact, widely different means may be utilized in the practice of the broader aspects of my invention.

What I claim, therefore, and desire to secure by Letters Patent is:

1. A two-way plow comprising supporting means, right and left hand plowing units, a pair of generally vertically spaced and generally longitudinally extending links connecting each unit with said supporting means for movement relative thereto, means for shifting one link of each pair of links generally longitudinaly to regulate the depth of plowing of the associated unit, and means engageable with one link of each unit for raising either or both units out of ground engaging position.

2. A two-way plow comprising supporting means, right and left hand plowing units, a pair of generally vertically spaced and generally longitudinally extending links connecting each unit with said supporting means for movement relative thereto, means for shifting one link of each pair of links generally longitudinally to regulate the depth of plowing of the associated unit, means engageable with one link of each unit for raising either or both units out of ground engaging position, and ground engaging gauge means movably connected with said supporting means and adapted to be engaged by either of said plowing units for limiting the depth of plowing thereof.

3. A two-way plow comprising right and left hand plowing units, gauge means between said units, and means whereby said gauge means serves to determine the operating depth of either plowing unit.

4. A two-way plow comprising supporting means, right and left hand plowing units, a pair of generally vertically spaced and generally longitudinally extending links connecting each unit with said supporting means, and alternately operable means connected, respectively, with one link of each pair for shifting it generally longitudinally, to regulate the depth of plowing, and for shifting it generally vertically, to raise and lower the plowing unit associated therewith.

5. An integral two-way plow adapted to be attached to a tractor or the like, comprising a pair of right and left hand plowing units, each unit including a furrow opener and a pair of relatively vertically spaced links connecting said plowing units with the tractor, a pair of independently movable members disposed coaxially and connected, respectively, with one link of each pair for changing the depth of penetration of said units, and means on said members acting through each of said links for raising the associated plowing unit independently of the other plowing unit.

6. A two-way plow comprising a cross bar, supporting means therefor, a pair of right and left hand plowing units, each including a generally vertical standard, a plow beam pivotally connected to the lower part of each standard and at its forward end pivotally connected with said cross bar, a depth adjusting and raising link pivotally connected to the upper end of each standard and extending generally in parallelism with the associated plow beam, a pair of adjusting levers pivotally mounted on said supporting means and operatively connected, respectively, with said links for shifting the same generally longitudinally to adjust the angular position of the associated plowing unit, and means adapted to engage said links for raising either or both of said plowing units into transport position.

7. A two-way plow as defined in claim 6, further characterized by a ground engaging gauge wheel disposed substantially midway between said plowing units, a member pivotally connecting said gauge wheel with said cross bar, and a part connected with each standard and adapted optionally to rest on said member, whereby when either plowing unit is in plowing position said gauge wheel serves to determine the maximum plowing depth.

8. A two-way plow as defined in claim 6, further characterized by a ground engaging gauge wheel disposed substantially midway between said plowing units, a member pivotally connecting said gauge wheel with said cross bar, a part connected with each standard and adapted optionally to rest on said member, whereby when either plowing unit is in plowing position said gauge wheel serves to determine the maximum plowing depth, and spring means connected between said supporting means and said member and capable of exerting sufficient force to overcome the weight of the gauge wheel and raise said gauge wheeel out of ground engaging position when both of said plowing units are in their transport position, said spring yielding when the weight of the rear portion of either plowing unit is imposed thereon through the associated part.

9. A two-way plow as defined in claim 6, further characterized by said link engaging raising means including hydraulic means reacting against said supporting means for raising either or both of said plowing units.

10. A tractor-mounted two-way plow comprising a cross bar, supporting means therefor, a pair of right and left hand plowing units, a pair of generally parallel links connected with each plowing unit and extending generally longitudinally forwardly thereof, one link of each pair of links being connected with said cross bar, a pair of axially aligned rock shafts carried on the tractor and operatively connected with the other link of each pair of links for adjusting the depth of operation of said plowing units and for raising either or both of them into transport position, and leveling connections between said rock shafts and said cross bar whereby when one plowing unit is in its transport position and the other is in plowing position, said other plowing unit is leveled to accommodate one of the tractor wheels running in the previously formed furrow.

11. A tractor-mounted two-way plow comprising a cross bar supported on the tractor in a transverse position adjacent the rear end thereof, a pair of right and left hand plowing units, each including generally vertically extending standards, a pair of plow beams pivotally connected adjacent their forward ends with the opposite ends of said cross bar so as to receive draft therefrom, the rear ends of said beams being pivoted, respectively, to said standards, reenforcing means at the forward end of each beam and associated with said cross bar whereby each beam is held in generally upright position by said cross bar, a pair of rock shafts mounted on said tractor above said cross bar and each having arm means carried thereby, a pair of upper links connected, respectively, with the upper ends of said standards and pivotally connected, respectively, with said arm means, whereby rocking movement of either rock shaft through a certain range of movement serves to shift the associated link member generally longitudinally and pivots the associated plowing unit about its point of connection with the rear end of the associated plow beam, thereby determining the depth of plowing of the plowing unit, means carried by each of said arm means and engageable with the associated link whereby movement of said rock shaft beyond said range acts through the associated link for raising the associated plowing unit into transport position, and a pair of links connected at their upper ends with the arm means forward of the axis of the associated rock shafts, said links being connected at their lower ends with the laterally outer ends of said cross bar, whereby when said rock shafts have been actuated to raise one plowing unit and lower the other, said cross bar is tilted so as to level the plowing unit in operating position.

12. A two-way plow as defined in claim 11, further characterized by a hydraulically operated cylinder and piston unit, means connecting one end of said latter unit with the tractor to impose the reaction on the latter, arm means pivotally supported on the tractor and operatively connected with the other end of said cylinder and piston unit, said latter arm means having a one-way connection with the arm means on said rock shafts, whereby extension of said cylinder and piston unit serves to raise both of said plowing units, and separate latch means for holding either or both of said plowing units in its raised position, irrespective of the position of said cylinder and piston unit.

13. A two-way tractor plow comprising a pair of right and left hand plowing units, means for movably connecting said units with the tractor for alternate operation with one rear wheel of the tractor running in the previously formed furrow and the other wheel on the land, means for adjusting the depth of operation, and means controlled by said last means for maintaining both plowing units level with respect to the ground position at all plowing depths.

14. In a two-way plow, a pair of right and left hand plowing units, a cross bar to which said units are connected in generally laterally rigid relationship, a pair of levers for raising and lowering said units, and connections between said levers and the cross bar whereby when one of said units is in raised position and the other is in a lowered position, said cross bar will be shifted by virtue of said connections into a position to level the plowing unit in plowing position.

15. In a two-way plow, a pair of laterally spaced brackets, a pair of axially aligned rock shafts pivotally supported at their outer ends, respectively, in said brackets, a sleeve-like member disposed about the adjacent ends of said aligned rock shafts, and means securing said sleeve-like member to one of said rock shafts, the other rock shaft being supported at its inner end by said sleeve-like member, each rock shaft being rockable independently of the other.

16. A two-way tractor plow comprising a pair of right and left hand plowing units, adapted for alternate operation, and hydraulic means for adjusting the depth of operation.

17. A two-way tractor plow comprising a pair of right and left hand plowing units, and hydraulic means having two ranges of movement, connections whereby operation of said hydraulic means through one range of movement controls the depth of operation, and connections whereby movement of said hydraulic means through its other range of movement raises the plowing units, or either of them, into their transport position.

18. A two-way tractor plow comprising a pair of right and left hand plowing units, each of said units including a beam adapted to be hitched to the tractor and a furrow opener pivoted to the rear end of said beam, manually controlled means for pivoting each furrow opener on the associated beam for adjusting the depth of operation, and hydraulic means for raising either or both of said units into their transport position.

19. A two-way tractor plow comprising a pair of right and left hand plowing units, a pair of generally vertically spaced and generally longitudinally extending links connecting each unit with the tractor, a pair of arms connected, respectively, with one link of each pair for controlling the position of said plowing units, respectively, and hydraulically operated means including means movable into a position to engage either or both of said arms for raising either or both of said plowing units into a transport position.

20. A two-way plow as defined in claim 19, further characterized by toggle latches for locking either or both of said plowing units in their transport position after they have been raised by said hydraulic means.

21. A two-way plow comprising supporting means, right and left hand plowing units, a pair of generally vertically spaced and generally longitudinally extending links connecting each unit with said supporting means for movement relative thereto, means for shifting one link of each pair of links generally longitudinally to regulate the depth of plowing of the associated unit, means engageable with one link of each unit for raising either or both units out of ground engaging position, said last named means including means movably mounted on said supporting means and operatively connected with the means that is engageable with said links, and hydraulic means operatively connected with said movable means for raising said units.

22. A two-way plow comprising right and left hand plowing units, gauge means between said units, means whereby said gauge means serves to determine the operating depth of either plowing unit, and spring means tending to raise said gauge means.

23. A two-way plow comprising right and left hand plowing units, gauge means between said units, means whereby said gauge means serves to determine the operating depth of either plowing unit, means for raising both units, and means tending to raise said gauge means when said units are raised.

24. A two-way plow comprising right and left hand plowing units, gauge means between said units, means whereby said gauge means serves to determine the operating depth of either plowing unit, means tending to raise said gauge means, and means on each unit rendering said raising means ineffective when such unit is in operating position.

25. A two-way plow comprising right and left hand plowing units, gauge means between said units, means tending to raise said gauge means, and stop means on each plowing unit engageable with said gauge means whereby said gauge means serves to determine the operating depth of either plowing unit.

26. A two-way plow comprising right and left hand plowing units, gauge means between said units, means tending to raise said gauge means, and cooperating stop means on said gauge means and both of said plowing units whereby said gauge means serves to determine the operating depth of either plowing unit.

27. A two-way plow comprising right and left hand plowing units, gauge means between said units, and adjustable stop means acting between said gauge means and each unit whereby said gauge means serves to determine the operating depth of either plowing unit.

28. A two-way plow comprising right and left hand plowing units, gauge means between said units comprising a ground engaging gauge wheel disposed substantially midway between said plowing units, and means whereby said gauge means serves to determine the operating depth of either plowing unit.

29. A two-way plow comprising right and left hand plowing units, gauge means between said units, comprising a ground engaging gauge wheel disposed substantially midway between said plowing units, means whereby said gauge means serves to determine the operating depth of either plowing unit, comprising a stop means whose position is gauged by said gauge wheel, stop means carried by said units and engageable with said first stop means, and means for adjusting one of said stop means.

WALTER H. SILVER.